H. H. HINDSHAW.
METHOD AND APPARATUS FOR TREATING PEAT AND THE LIKE.
APPLICATION FILED JULY 3, 1918.
1,334,492.
Patented Mar. 23, 1920.
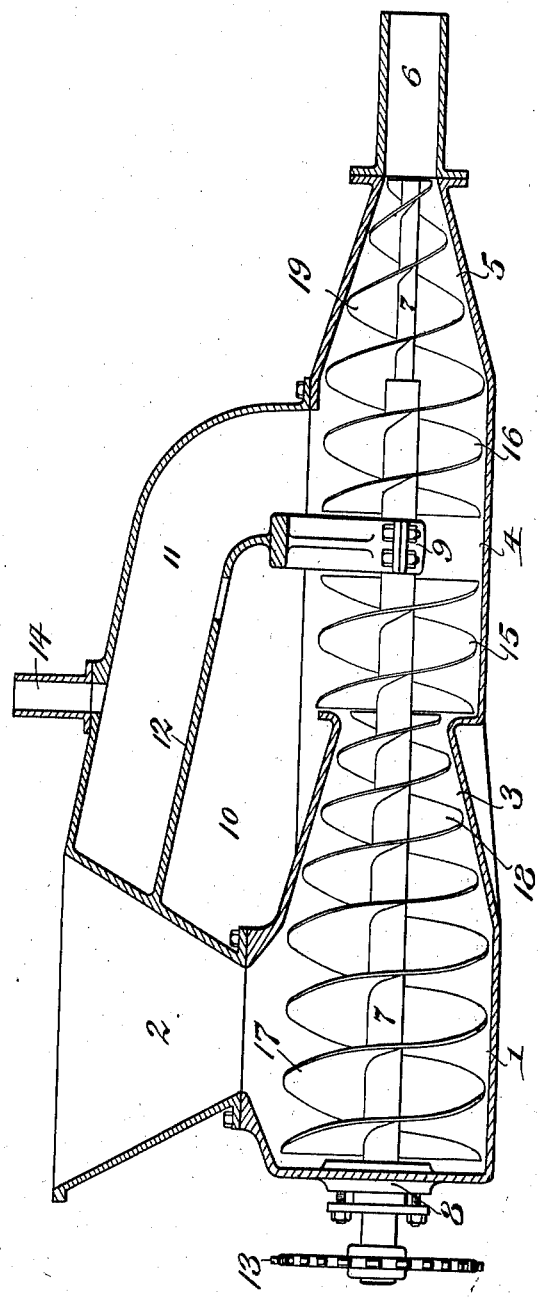

UNITED STATES PATENT OFFICE.

HENRY H. HINDSHAW, OF ANN ARBOR, MICHIGAN.

METHOD AND APPARATUS FOR TREATING PEAT AND THE LIKE.

1,334,492. Specification of Letters Patent. Patented Mar. 23, 1920.

Application filed July 3, 1918. Serial No. 243,105.

*To all whom it may concern:*

Be it known that I, HENRY H. HINDSHAW, a citizen of the United States, residing in Ann Arbor, in the county of Washtenaw and State of Michigan, have invented new and useful Improvements in Methods and Apparatus for Treating Peat and the like, of which the following is a specification.

This invention relates to a method and apparatus for treating materials containing water or moisture and air or gases and it has the object to facilitate the final drying of such materials and render the same more suitable as fuel or for other purposes. Although this invention is more particularly intended for treating peat in which a chemical as well as a physical change occurs during the operation of dehydrating or drying the same by exposure to the ordinary atmosphere or subjecting the same to other drying means, this invention is also applicable for treating other materials of a similar character before drying the same.

Peat has certain pecularities which prevent the same from giving off water in a manner common to most other substances, this being due to the fact that the same contains a jelly-like substance and vegetable fibers. Owing to this composition water can not be removed from peat by means of a filter press, such for instance, as is employed for removing surplus moisture from clay, inasmuch as the fibers in the peat produce an impervious coating on the filtering medium and therefore interfere with the passage of water therethrough when attempting to remove excess water or moisture from peat by this means. When peat is dried in its wet condition in the atmosphere a long time is required for this purpose and the escaping water leaves innumerable cavities or cells therein which are filled with air so that the same is not a solid or compact mass. Peat as dug from its bed and dried consists of a spongy mass which retains, when apparently dry, about twenty to twenty-five per cent. water which causes the same to burn very slow and emit a large amount of pungent fumes or smoke so that the same is not acceptable as fuel. The body of peat contains a starch-like substance which is known as pectin and contains water. On drying this substance the same becomes anhydrous pectose which will not absorb water. It has been attempted to mill or puddle the raw peat before drying the same which operation reduces the percentage of voids and consequently permits of drying the same more perfectly, but in actual practice this process can only be carried out very imperfectly owing to its prohibitive cost.

My invention contemplates eliminating the cavities or cells in the peat after the same has been dug from the beds and is still in a wet or moist condition whereby the above mentioned chemical change does not take place within the interior of the mass of peat, but is confined to the outside of a block of such material and only then after the mass has become comparatively dry all through. Furthermore the shrinkage is evenly distributed throughout the block or mass and thereby produces a structure which is not spongy and liable to crack. Moreover, the moisture in the block of peat after the elimination of such cavities or cells may be rapidly and almost completely removed by drying either in the ordinary atmosphere or by other means.

In my improved method and apparatus the air or gases are preferably removed from the wet mass or blocks of peat by agitating this material *in vacuo* whereby large quantities of peat may be treated economically and expeditiously and a product obtained which is compact and disinclined to re-absorb air or gas. The same is of a solid or hard form best suited for use as fuel or for distillation to produce a hard charcoal or for other purposes. Its use for fuel is particularly advantageous by reason of the fact that in this form it does not give off offensive fumes or smoke, such as occurs when burning ordinary peat.

The figure in the accompanying drawing is a longitudinal section of one form of apparatus capable of practising my improved method of preparing peat and similar substances to facilitate its drying.

In this machine 1 represents a primary loosening and mixing chamber which is preferably constructed in the form of a horizontal cylinder and provided with an inlet in its top through which the wet peat as it is dug from the beds, or other material which is to be dried, may be introduced into this primary chamber. Above this chamber is arranged a filling or guide hopper 2 whereby the material to be treated is directed into this chamber. At one end of the primary cylinder is arranged a compressing tube 3 which is constructed of conical form and arranged axially in line with the primary cylinder and has its large end communicating with one end of said cylinder while its small end is provided with a discharge opening.

4 represents a secondary loosening and mixing chamber which is also of cylindrical form and arranged axially in line with the primary compressing tube and communicates at one end with the small outlet of the same. At its opposite end the secondary loosening and mixing cylinder communicates with the large end of a secondary compressing tube 5 which is of conical form and arranged axially in line with the secondary loosening and mixing cylinder. The small or outlet end of the secondary compressing tube communicates with a horizontal discharge tube 6 which is arranged axially in line therewith and is of substantially the same diameter as the outlet of the secondary compressing tube. The outlet of the primary compressing tube is larger and preferably twice the diameter of the outlet of the secondary compressing tube. Extending lengthwise and axially through the primary and secondary cylinders and tubes is a shaft 7 which is journaled in a bearing 8 on the outer head of the primary cylinder and in a bearing 9 arranged within the central part of the secondary cylinder and connected with the walls thereof. Communicating with the top of the secondary cylinder is a vacuum chamber which is preferably divided by an inclined partition 12 into a lower front section 10 which communicates with the front part of the secondary cylinder and an upper rear part 11 which communicates with the rear part of said secondary cylinder. Communicating with the upper rear section of the vacuum chamber is a suction or exhaust pipe 14 which is connected with a vacuum pump or other suitable means whereby the air is withdrawn from the interior of the vacuum chamber and the spaces communicating therewith for producing a vacuum therein and causing the materials therein to be operated upon *in vacuo.*

Within the primary cylinder a cylindrical screw 17 is mounted on the shaft 7 which screw operates to loosen and mix the peat or other material which is delivered into this cylinder. Mounted on this shaft within the primary compressing tube is a conical compressing screw 18 which practically forms a continuation of the primary loosening and mixing screw. Arranged within the secondary cylinder and mounted on the adjacent part of the shaft are two sections 15, 16, of a secondary cylindrical loosening and mixing screw which operates upon the material within this cylinder and causes the same to be thoroughly loosened and mixed. Within the secondary compressing tube and mounted on the adjacent part of the shaft is a secondary compressing screw 19 which practically forms a continuation of the adjacent section of the secondary loosening and mixing screw.

This shaft and the several screws mounted thereon may be rotated in any suitable manner for instance, by means of a sprocket wheel 13 applied to the front end of the shaft outside of the primary cylinder and adapted to receive a chain belt.

In practising my improved method of treating peat by the use of this machine the wet peat as it is dug from the beds is placed within the hopper 2 which conducts the same into the primary cylinder 1. While in this cylinder the primary cylindrical screw 17 operates to thoroughly loosen and mix the peat so that all parts of the same are broken up and the same is of substantially the same texture throughout. As this loosening and mixing of the peat takes place the same is also conveyed by means of the screw 17 toward the primary compressing tube 3 within which the feeding and mixing operation is continued by the action of the primary conical screw 18 although the latter operates principally to compress the peat and render the same more dense and also cause the peat to effectively plug or close the small or outlet end of the primary tube through which it gradually escapes and thereby prevents the passage of air inwardly through the hopper, primary cylinder and tube, to the passages in rear of the same. Upon leaving the primary tube 3 the peat enters the secondary cylinder 4 wherein the same is again mixed and loosened by the operation of the secondary cylindrical screw sections 15, 16 which also propels the material lengthwise through this cylinder. While the peat is being agitated in the secondary cylinder 4 the cells or cavities therein are exposed or opened up and any air or gases contained in these cavities or cells is withdrawn therefrom by vacuo into the front and rear sections 10, 11 of the vacuum chamber and then carried off through the exhaust pipe 14. The solid part of the partition 12 is arranged between the open upper side of the front part of the secondary cylinder 4 and the exhaust pipe 14 so that this partition operates as a baffle for preventing any small particles of peat or dust which may be free from being drawn away by the suction through the exhaust pipe 14. After the air and gases have been thus removed by vacuum from the peat in its passage through the secondary cylinder 4 the same enters the secondary compressing tube 5 in which it is moved forwardly and also compressed by the operation of the secondary conical screw 19. As the peat escapes from the rear end of the secondary tube 5 the same is compressed to a greater extent than the compression which the same sustains by the operation of the primary conical tube 3 and screw 18 inasmuch as the outlet of the primary tube 3 is larger than the outlet of the small end of the secondary conical tube 5. While in this maximum compressed condition the peat passes from the secondary conical tube 5 to the discharge cylinder 6 which latter is of sufficient length so that when the same is filled with peat an air seal will be formed therein which prevents the entrance of air at this point into the secondary compressing tube and cylinder and the vacuum chamber. As the treated peat escapes from the rear end of the discharge cylinder 6 the same may be briqueted or cut into slices or blocks by any suitable means. Thereafter these briquets or blocks are dried either in the atmosphere or by any other suitable means.

It has been found in practice that when peat is operated upon in the manner described by this machine practically all of the air and gases which are usually trapped in the cavities or cells therein are removed therefrom together with any free water, moisture or vapor which may have been mixed therewith and that this peat when subsequently dried either in the atmosphere or otherwise will shrink into a practically solid mass which does not permit hydration of the same and therefore enables this material to be burned as fuel without any resultant pungent fumes or smoke as well as permitting this material to be distilled for driving off and utilizing its volatile contents and leaving a dense charcoal which may be utilized in the arts for various purposes.

It is therefore possible by this method and apparatus to treat peat and render the same ready for commercial use economically and expeditiously and make it possible to use the same advantageously as a substitute for coal or wood and also utilize its by-products profitably.

I claim as my invention:

1. The hereindescribed process of de-hydrating wet peat which comprises agitating the peat for loosening and mixing the same and breaking the air cells therein, then condensing the same, then again loosening and mixing the same in the presence of vacuo for removing the air contained in the cells thereof, and then again compressing the peat.

2. A machine for de-hydrating wet peat which comprises a primary cylindrical loosening and mixing cylinder having an inlet for the wet material, a primary conical compressing tube arranged axially in line with said primary cylinder and having its large end communicating with the same, a secondary loosening and mixing cylinder arranged axially in line with said primary cylinder and tube and communicating with the small end of said primary tube, a secondary conical compressing tube arranged axially in line with said secondary cylinder and having its large end communicating with said secondary cylinder and having an outlet at its small end, a vacuum chamber communicating with said secondary cylinder and having a partition which divides the same into front and rear sections and said rear sections having an exhaust outlet, a primary cylindrical screw arranged in the primary cylinder, a primary conical screw arranged in the primary tube, a secondary cylindrical screw arranged in the secondary cylinder, a secondary conical screw arranged in the secondary tube, and a shaft on which said screws are mounted.

HENRY H. HINDSHAW.